United States Patent [19]

Wille

[11] Patent Number: 5,035,195

[45] Date of Patent: Jul. 30, 1991

[54] VALVE SHUT-OFF FLAG

[76] Inventor: Franklin Wille, 123 Maple Dr., Knollwood East, Mankato, Minn. 56001

[21] Appl. No.: 539,438

[22] Filed: Jun. 18, 1990

[51] Int. Cl.⁵ .......................... F16K 37/00; F16P 3/08
[52] U.S. Cl. .................................. 116/277; 116/311; 137/382; 137/553
[58] Field of Search ............... 116/277, 306, 309, 311, 116/312, 313; 137/382, 553

[56] References Cited

U.S. PATENT DOCUMENTS

| | | | |
|---|---|---|---|
| 533,615 | 2/1895 | Siver | 116/277 |
| 1,003,131 | 9/1911 | Bellingrath | 116/277 |
| 2,015,398 | 9/1935 | Furtney | 116/277 |
| 2,134,029 | 10/1938 | Chambers | 116/277 |
| 2,439,696 | 4/1948 | Schaal | 116/313 |
| 2,700,363 | 1/1955 | Waskiw | 116/277 |
| 4,301,828 | 11/1981 | Martin, Jr. | 137/382 |
| 4,352,370 | 10/1982 | Childress | 137/382 |
| 4,702,275 | 10/1987 | Ballun et al. | 116/277 |

FOREIGN PATENT DOCUMENTS 2458279  6/1976  Fed. Rep. of Germany ...... 116/277

Primary Examiner—William A. Cuchlinski, Jr.
Assistant Examiner—John L. Beres
Attorney, Agent, or Firm—Albert W. Watkins

[57] ABSTRACT

A hinged two piece structure to remind an operator that a valve is on is disclosed. The valve shut-off flag is retained to a valve by a simple clamp and is therefore readily adaptable for use on many different types of valves, although the preferred embodiment has application on oxygen-acetylene torch sets. One piece of the structure acts as a support column for a hinge and a second piece of structure. The second structure piece partially covers the valve when the valve is in the closed or shut position. In order to turn on the valve, a user must lift the second structure piece to an upright position where it extends substantially beyond the valve. The second structure piece is of sufficient surface area and colored appropriately so as to catch the eye of a user.

8 Claims, 2 Drawing Sheets

VALVE SHUT-OFF FLAG

BACKGROUND OF THE INVENTION

1. Field of the Invention

The present apparatus pertains generally to fluid control valves such as might commonly be found in water control or gas canisters, and specifically to indicator devices which signal the on or off state of the valve.

2. Description of the Related Art

Valves used to control the movement of fluids often times exist in an environment where it is not possible to view the fluid to determine motion of that fluid. This might occur in a water main where by the location of the main underground no sighting of water flow is possible from above ground. Another similar situation arises in the case of pressurized gas canisters due to potential transparency and lack of odor of the gas. In the particular case of the pressurized gas canister, even if a downstream valve is closed, the gas may still seep through. A resultant slow leak may pose health hazards dependent upon the gas type. The slow leak will also prove annoying and expensive in the replacement cost of the gas.

Several systems have been devised to indicate to a viewer or listener that a valve has undesirably been left in the open or on position. One system is disclosed by Furtney in U.S. Pat. No. 2,015,398. Furtney discloses a waterglass valve which, when in the off position, prominently displays a "differently" colored "shut" sign. The Furtney system requires that the valve be designed to accomodate the "shut" flag, and will not operate as a retrofit. Further, the Furtney valve would have to be substantially redesigned to be of any use on a system different than the boiler type system for which it was designed.

Another system is shown by Haws in U.S. Pat. No. 4,665,386. Haws discloses an electromechanical annunciating device. The device readily attaches to a pressurized gas canister at the valve. When rotated in the opening direction, a timer starts and will activate a bell if the valve is not closed. While the Haws system is readily retrofitted to any type of hand actuated valve, the operation and effectiveness of the device is questionable. If an explosive gas were to be left on and unattended for some reason, the activation of the device could cause a dangerous explosion. Additionally, if a user of the tank finishes hurriedly and leaves, the annunciater will ring without anyone being around to hear it. Then the user will not only have to replace the gas, but also the batteries.

OBJECTS OF THE INVENTION

It is an object of the present invention to provide an apparatus to indicate the position of a valve.

It is a further object of the present invention to provide an apparatus which utilizes only one operatively moving part, and which therefore has little to wear out or break during normal operation.

It is a further object of the present invention to provide an apparatus which is extremely reliable, and of simple and cost effective construction.

It is a further object of the present invention that the apparatus be readily retrofitted once the unit is delivered to a final destination, and that it be easily understood and if needed at a later date, replaced by persons who own, operate, repair, or otherwise rely upon it.

The device should provide an operator a lifetime of service and should be maintenance free.

SUMMARY OF THE PRESENT INVENTION

The preferred embodiment of the present invention is a hinged two piece metal structure which is retained to a pressurized gas canister by a simple expandable clamp. One piece of the metal (or other material) acts as a support column for the hinge and a second piece of metal. The second piece of metal acts as a sort of cover for the valve when the valve is in the closed or shut position. In order to turn on the valve, a user must lift the second piece of metal to an upright position where it extends several inches beyond the tank. The second piece of metal is of sufficient surface area and colored appropriately so as to catch the eye of the forgetful user.

These and other features of the invention will be more readily understood upon consideration of the detailed description hereinbelow.

DETAILED DESCRIPTION OF THE PREFERRED EMBODIMENT

Figure 1:
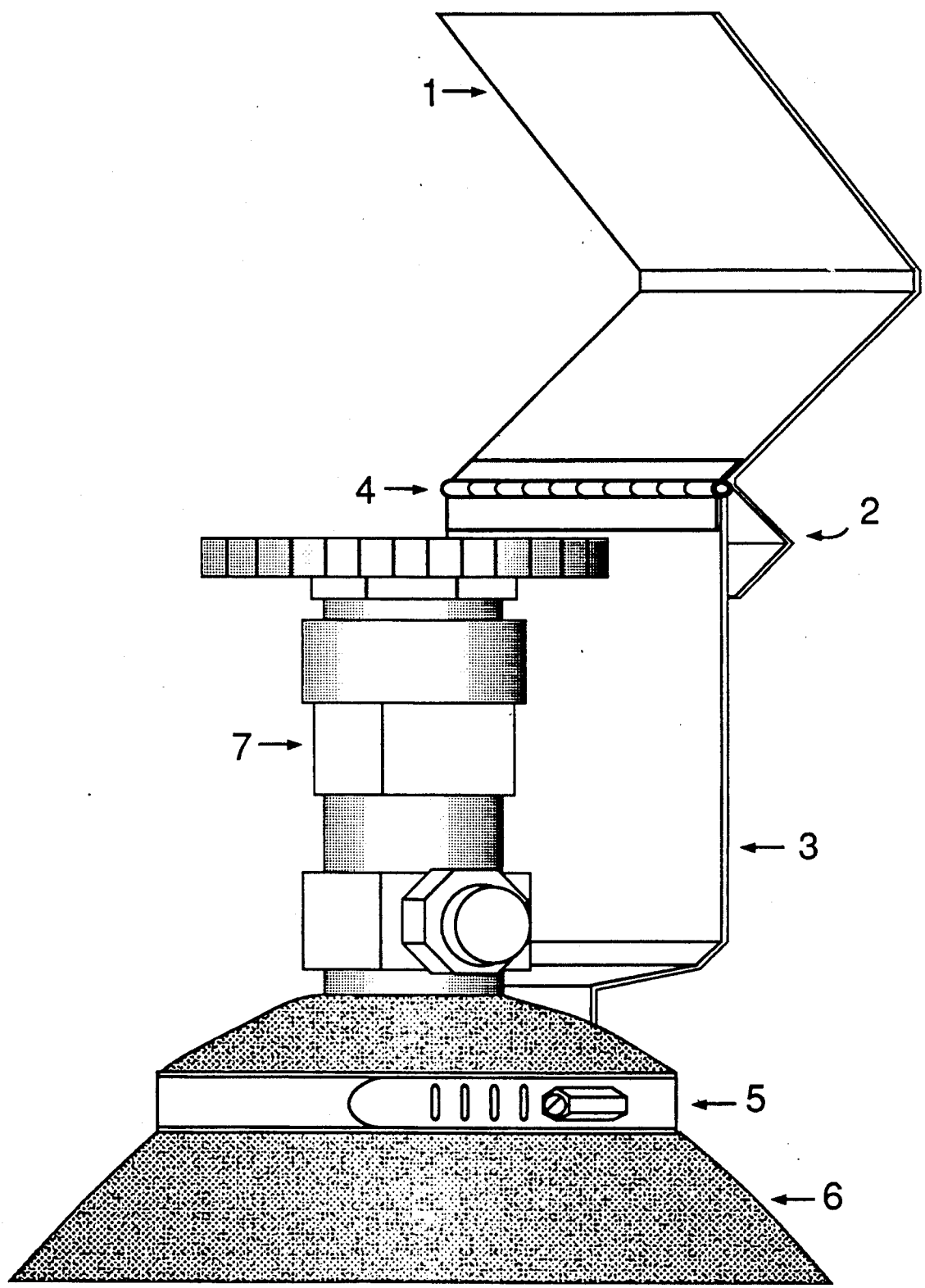
FIG. 1 shows a projected view of the preferred embodiment of the present invention installed and indicating an open or on condition.

Referring to FIG. 1, the apparatus of the preferred embodiment of the present invention is shown by projected view in an operative state indicating that the valve of interest is in an on position. Gas tank 6 having valve 7 is retrofitted by the attachment of securing clamp 5 around tank 6 near the neck of tank 6. Clamp 5 may be any suitable clamp, although an adjustable hose type clamp is preferred. Vertical support 3 is retained by clamp 5 in an extended position essentially parallel to valve 7. Opposite clamp 5 is a hinge 4 which flexibly interconnects indicator 1 to vertical support 3. As illustrated in the on position, stop 2, a special angled extension of indicator 1, rests against vertical support 3 and prevents further rotational motion of hinge 4. This causes the concave side of indicator 1 to be openly displayed, while simultaneously allowing access to valve 7. In the preferred embodiment, the concave side of indicator 1 is brightly colored so as to be readily visible at a great distance. To provide adequate contrast, the convex side of indicator 1 is darkly colored or black.

Figure 2:
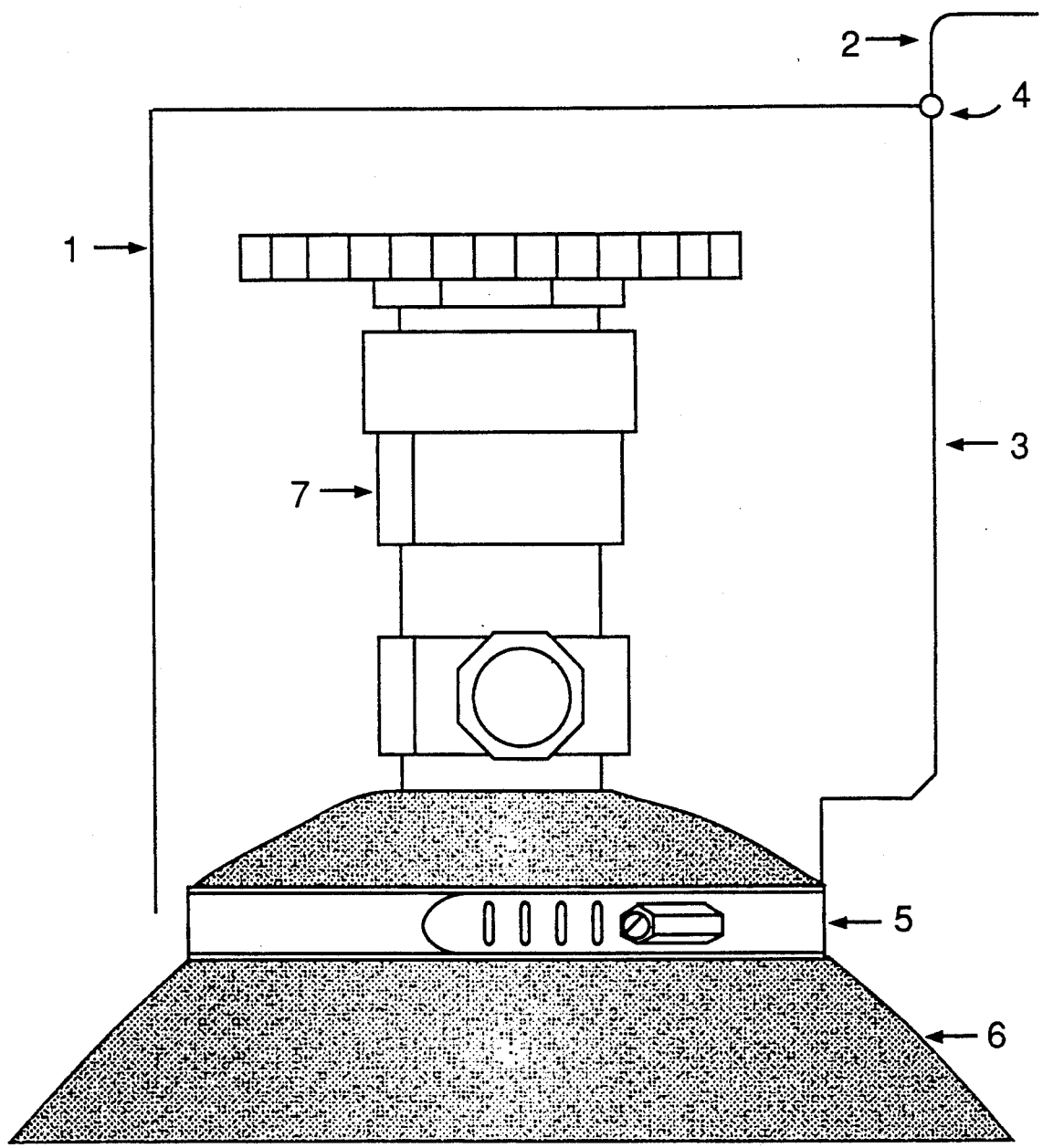
FIG. 2 shows a side view of the preferred embodiment of the present invention operatively installed and indicating a closed or shut position.

FIG. 2 illustrates the preferred embodiment of the present invention from a side view with the apparatus indicating the valve to be in a closed position. In this position only the darkly colored convex side of indicator 1 is exposed. Additionally, indicator 1 is nearly flush with the top of valve 7. As previously noted, this provides excellent visible confirmation of the current on-off position of the valve without requiring expensive retrofitting of tanks, without posing health hazards, and while maintaining essentially all of the convenience ordinarily associated with a plain valve.

Additionally, vertical support 3 and indicator 1 are shown to have particular configurations which are felt to be of significance to the manufacturability, strength and resiliency of the structure as a whole. At important stress points double angles are used to allow greater flex without breakage.

To install the valve shut-off flag with a typical oxygen-acetylene torch set, the flag is attached to the taller tank which is usually the oxygen tank. This is simply accomplished using an ordinary screw driver. The clamp 5 is tightened onto tank 6 in the area of tank 6 where the threads for a safety cap are located. The indicator 1 is folded forward and down to the position illustrated in FIG. 2 which is indicative of a closed valve.

To operate valve 7 of the oxygen-acetylene torch, the valve shut-off flag indicator 1 must be pivoted about hinge 4 until stop 2 contacts vertical support 3 in order to gain access to valve 7. This may be accomplished by a simple flipping of indicator 1. The inside (concave side) of indicator 1 and the inside of vertical support 3 are now exposed to view, indicator 1 extending beyond the top of valve 7. As aforementioned, the inside of indicator 1 and support 3 are brightly colored so as to highly contrast the background surrounding valve 7. This will remind the operator that the tank valve is still open after use. The valve shut-off flag operates by vision sighting only and does not therefore risk any electrical disturbance which could in the wrong circumstance produce an explosion.

The foregoing description of the preferred embodiment of the present invention is in no way intended to limit the breadth of the present invention. Changes or variations which are within the scope of one of ordinary skill in the art are considered to be encompassed within the foregoing description.

Having thus described my invention, I claim:

1. An apparatus for indicating an open or closed position of a valve, said valve protruding from a tank primarily along a first axis, comprising:
a first member extending in a direction essentially parallel to said first axis,
a flexible means for interconnecting said first member to a second member,
said second member having a first surface and a second surface,
said second member being pivotable with respect to said first member, wherein said first surface of said second member pivots from extending in a first direction essentially parallel to said valve to extending in a second direction essentially perpendicular to said axis, said second surface of said second member being substantially parallel to said first member and radially opposite of said valve relative to said first member when said first surface of said second member is perpendicular to said axis, said second surface of said second member having a dimension in a direction parallel to said axis substantially similar to a corresponding dimension of said first member.

2. The apparatus of claim 1 wherein said second member restricts access to said valve when said first surface of said second member extends perpendicular to said axis.

3. The apparatus of claim 1 wherein said second member is comprised by a first body portion and a second pivotal stop portion, said second pivotal stop portion restricting said pivoting of said second member in one rotational direction.

4. The apparatus of claim 3 wherein said second member is rotationally stopped by said second pivotal stop portion when both said first surface and said second surface of said second member extend from said first member at an angle of substantially 45 degrees relative to said axis.

5. The apparatus of claim 1 wherein said second member is comprised by a first body portion, said first body portion having a first surface and a second surface.

6. The apparatus of claim 5 wherein said first body portion is more optically visible on said first surface than on said second surface.

7. The apparatus of claim 5 wherein said first body portion is essentially arcuate and said first surface comprises a concave portion of said first body portion.

8. The apparatus of claim 7 wherein said second surface comprises a convex portion of said first body portion.

* * * * *